United States Patent [19]

Fukui et al.

[11] Patent Number: 5,566,280

[45] Date of Patent: Oct. 15, 1996

[54] 3D DYNAMIC IMAGE PRODUCTION SYSTEM WITH AUTOMATIC VIEWPOINT SETTING

[75] Inventors: Mika Fukui; Miwako Doi, both of Kanagawa-ken, Japan

[73] Assignee: Kabushiki Kaisha Toshiba, Kawasaki, Japan

[21] Appl. No.: 309,446

[22] Filed: Sep. 20, 1994

[30] Foreign Application Priority Data

Sep. 20, 1993 [JP] Japan ................................... 5-232653

[51] Int. Cl.$^6$ ................................................. G03B 21/32
[52] U.S. Cl. ................................. 395/119; 348/229
[58] Field of Search ........................ 395/119, 120, 395/121, 133, 134; 348/229, 362, 364

[56] References Cited

U.S. PATENT DOCUMENTS 4,283,766  8/1981  Snyder ........................................ 364/525

OTHER PUBLICATIONS

Drucker et al., "Cinema: A System for Procedural Camera Movements", Proceedings of 1992 Syposium on Interactive 3-D Graphics, (1992), p. 70.

Drucker et al., "Cinema: A System for Procedural Camera Movements", Proceedings of 1992 Syposium on Interactive 3-D Graphics, (1992), pp. 66-69.

*Primary Examiner*—Phu K. Nguyen
*Assistant Examiner*—Cliff N. Vo
*Attorney, Agent, or Firm*—Foley & Lardner

[57] ABSTRACT

A 3D dynamic image production system capable of automatically producing the appropriate viewpoint data for observing the target object. In this system, object data indicating objects and viewpoint data indicating a viewpoint are inputted, and an imaging target object to be imaged is specified. Then, whether a blocking of a viewing axis with respect to the imaging target object by another object is judged, where the viewing axis is determined according to the viewpoint data, and the viewpoint data is changed when it is judged that the viewing axis is blocked. The 3D dynamic image of the imaging target object is then produced according to a new viewing axis determined from the changed viewpoint data.

22 Claims, 10 Drawing Sheets

OBJECT A

FIG. 3C

OBJECT B

$$\frac{Y_A}{2D} = \tan\left(\frac{\alpha}{2}\right)$$

$$D = \frac{Y_A}{2 \cdot \tan\left(\frac{\alpha}{2}\right)}$$

$$y_r = \frac{Y_A}{2} + y_1 + y_2$$

$$y_1 = \frac{D-D'}{D} \cdot (Y_A - y_v)$$

$$y_2 = \frac{D-D'}{D} \cdot (y_v - \frac{Y_A}{2})$$

$$y_r = \frac{Y_A}{2} + \frac{D-D'}{D}(Y_A - y_v + y_v - \frac{Y_A}{2})$$

$$= \frac{Y_A}{2} + \frac{Y_A}{2} \cdot \frac{D-D'}{D} = Y_A(1 - \frac{D'}{2D})$$

$$\boxed{y_r = Y_A(1 - \frac{D'}{2D})}$$

FIG. 8A y
→ x,z  (VIEWING DIRECTION)

$$y_r = Y_A \left(1 - \frac{D'}{2D}\right) \quad (\text{FROM FIG. 6})$$

$$y_v' - y_v = \frac{(D-D')(Y_A - y_v)}{D}$$

$$y_v' = y_v + \frac{(D-D')(Y_A - y_v)}{D}$$

FIG. 13

3D DYNAMIC IMAGE PRODUCTION SYSTEM WITH AUTOMATIC VIEWPOINT SETTING

BACKGROUND OF THE INVENTION

1. Field of the Invention

The present invention relates to a system for producing three dimensional (3D) dynamic images.

2. Description of the Background Art

In recent years, computer graphics (CG) are often utilized for simulating the external appearance, the interior, and the lighting of buildings, etc. In addition, CG animation is widely utilized in the video media such as motion pictures and TV commercial messages. The system used in these cases has an interface enabling the operator to specify the viewpoint meticulously in each scene by using a video camera model imitating the real world, but such a system is designed for use by the specialized operator, so that for a general user without any specialized knowledge concerning the CG, the camera control, and the video production, it is quite difficult to operate this system properly and it usually requires numerous trials and errors.

On the other hand, in the field of virtual reality (VR), interactive operation is regarded as important, so that there is a function for enabling the user to freely walk around the virtual world by using the various 3D input devices such as a 3D mouse. Therefore, in VR, the user can produce the realistic video images as if the user is in a position of a cameraman using a portable video camera. However, the 3D input devices are still associated with the problems of precision and naturalness of the inner force sense feedback, so that it is still not so easy to master its handling and the unfamiliar user is unlikely to be able to handle it accurately. In the simulator of the automobile or the airplane, exactly the same movements as in reality can be obtained by exactly the same operations as in reality, so that the desired video images cannot be obtained unless the user has sufficient operation skills in reality. In the simulation game machine, the degrees of freedom in directions or ranges of movements are limited in order to make it possible for a general user to enjoy the game playing, so that the operation is relatively easier than the case of unlimited degrees of freedom, but truly realistic video images are not necessarily obtainable.

Normally, the video images are produced for the purpose of either recording necessary information or for creating some effect, but the majority of the cases in which a general user uses the video camera are in the former category, and in this type of the video camera usage, it is important to be able to capture a target object in a proper size from a proper angle in each scene and provide a natural sense of continuation in the successive scenes. However, it is still difficult for a general user to have full command of these aspects by means of the conventionally available interface. In particular, in a case where the target object is moving, the often encountered difficulties include a situation in which the target object becomes invisible as it is hidden behind the other objects, and a situation in which the target object is focused too closely such that it becomes impossible to tell which way the target object is viewed from.

In short, in the conventionally available system, it has been impossible for a general user to obtain the satisfactory video images, especially in a case of producing the dynamic images, by simply following the target object by the video camera.

SUMMARY OF THE INVENTION

It is therefore an object of the present invention to provide a 3D dynamic image production system capable of automatically producing the appropriate viewpoint data for observing the target object.

According to one aspect of the present invention there is provided a 3D dynamic image production system, comprising: means for inputting object data indicating objects and viewpoint data indicating a viewpoint; means for specifying an imaging target object to be imaged; means for judging a blocking of a viewing axis with respect to the imaging target object by another object, the viewing axis being determined according to the viewpoint data; means for changing the viewpoint data when the judging means judges that the viewing axis is blocked; and means for producing a 3D dynamic image of the imaging target object according to a new viewing axis determined from the viewpoint data changed by the changing means.

According to another aspect of the present invention there is provided a method for producing a 3D dynamic image, comprising the steps of: inputting object data indicating objects and viewpoint data indicating a viewpoint; specifying an imaging target object to be imaged; judging a blocking of a viewing axis with respect to the imaging target object by another object, the viewing axis being determined according to the viewpoint data; changing the viewpoint data when it is judged that the viewing axis is blocked at the judging step; and producing a 3D dynamic image of the imaging target object according to a new viewing axis determined from the viewpoint data changed at the changing step.

Other features and advantages of the present invention will become apparent from the following description taken in conjunction with the accompanying drawings.

DETAILED DESCRIPTION OF THE PREFERRED EMBODIMENTS

Figure 1:
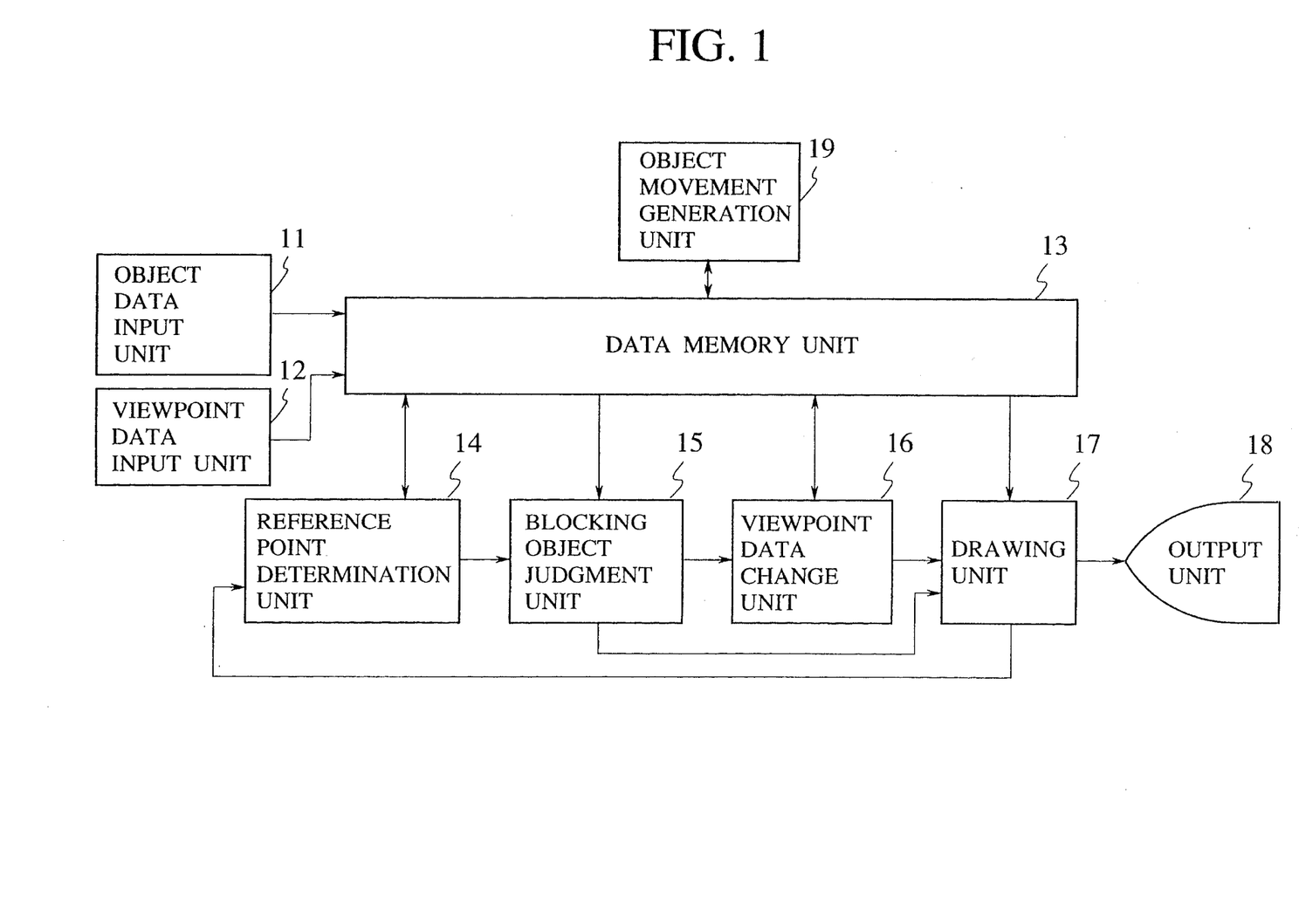
FIG. 1 is a block diagram of one embodiment of a 3D dynamic image production system according to the present invention.

Referring now to FIG. 1, one embodiment of the 3D dynamic image production system according to the present invention will be described in detail.

In this embodiment, the system has a configuration as shown in FIG. 1, which comprises an object data input unit 11, a viewpoint data input unit 12, a reference point determination unit 14, a block object judgement unit 15, a viewpoint data change unit 16, a drawing unit 17, and an object movement generation unit 19, all of which are connected with a data memory unit 13. In addition, the system includes an output unit 18 connected with the drawing unit 17, while the reference point determination unit 14 is connected to the blocking object judgment unit which is connected to the viewpoint data change unit 16 and the drawing unit 17, and the viewpoint data change unit 16 is connected to the drawing unit 17 which is connected to the reference point determination unit 14.

The object data input unit 11 enters data of each object such as its shape, color, size, position, orientation, texture, light source position, etc., which are given by a user through input means such as a keyboard, mouse, image scanner, or other memory devices or communication devices.

Similarly, the viewpoint data input unit 12 enters viewpoint data expressed by a camera position of a video camera, a reference point, and a view angle, etc., for example. In addition, the viewpoint data input unit 12 also enters a specification as to which object among the objects whose object data are entered at the object data input unit 11 is going to be set as an imaging target of the video camera.

These object data and viewpoint data entered at the object data input unit 11 and the viewpoint data input unit 12 are then stored in the data memory unit 13.

The reference point determination unit 14 determines which point in the space is going to be set as a reference point of the video camera according to data such as positions of the video camera and the object corresponding to the specified imaging target which are stored in the data memory unit 13. The determined reference point is also stored in the data memory unit 13.

The blocking object judgment unit 15 judges a presence or absence of a blocking object between the video camera and the reference point according to data concerning the camera position, the determined reference point, and the position and size of the object which are stored in the data memory unit 13.

The viewpoint data change unit 16 changes the viewpoint data such as the camera position and the reference point stored in the data memory unit 13 according to the data concerning positions and sizes of the imaging target and the blocking object stored in the data memory unit 13 and the previous viewpoint data, when it is judged that the blocking object concealing the imaging target is present by the blocking object judgment unit.

The drawing unit 17 produces 3D images from the data stored in the data memory unit 13, and the produced 3D images are outputted at the output unit 18 in a form of a display, a large size screen, or a liquid crystal panel, etc., for example.

In a case of changing the position of the object or setting the object in movement, the object movement generation unit 19 generates the movements of the object, and rewrites the data concerning the object in the data memory unit 13. Here, in a case of dealing with a portion of a whole Object such as a hand, a leg, or a torso, data concerning a position, an angle, as well as how far it can be rotated or moved at most are stored in the data memory unit 13 for each portion according to the 3D coordinate system.

Figure 2:
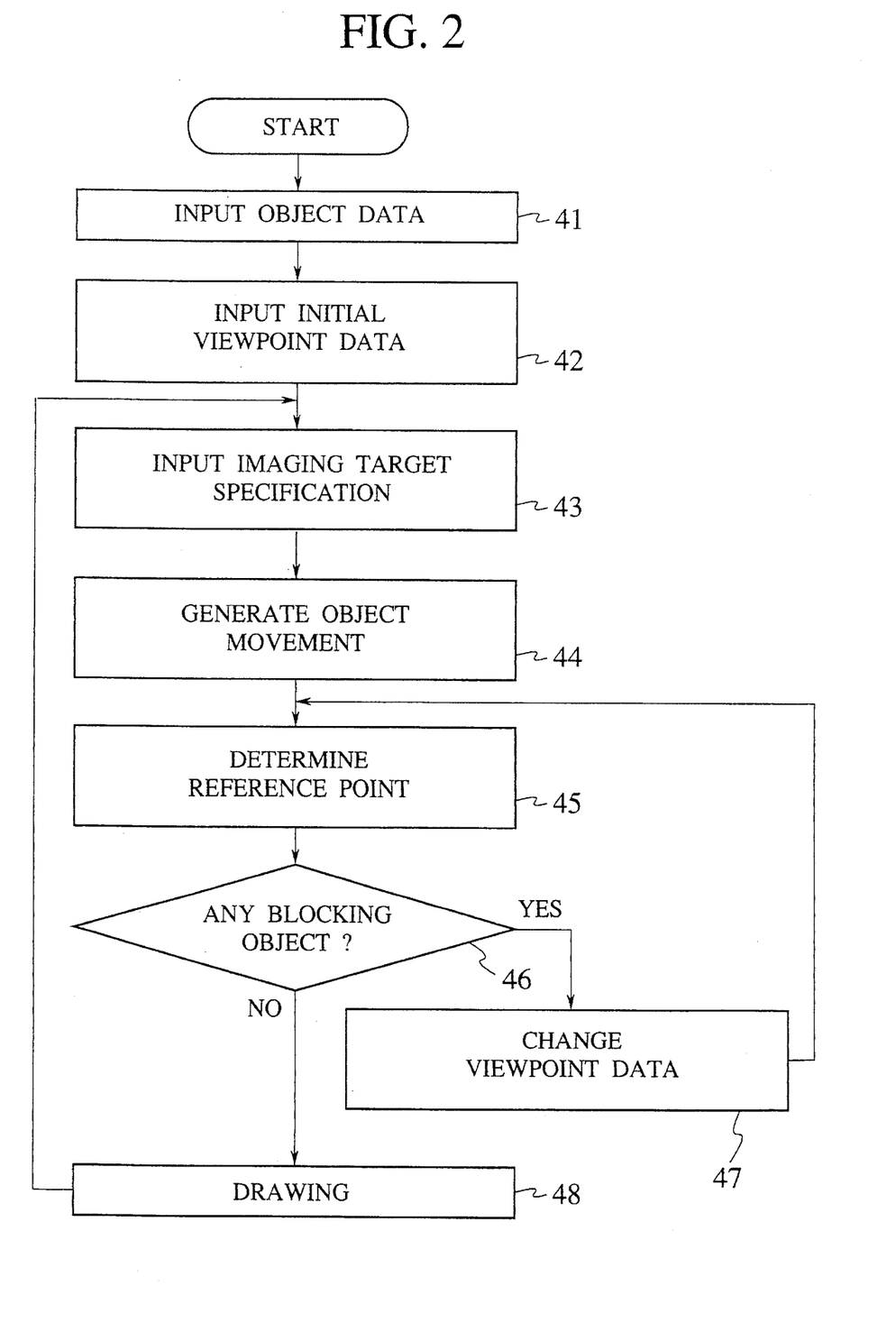
FIG. 2 is a flow chart for the operation of the system of FIG. 1.

Now, the operation of this system of FIG. 1 will be described according to the flow chart of FIG. 2.

Figure 3A:
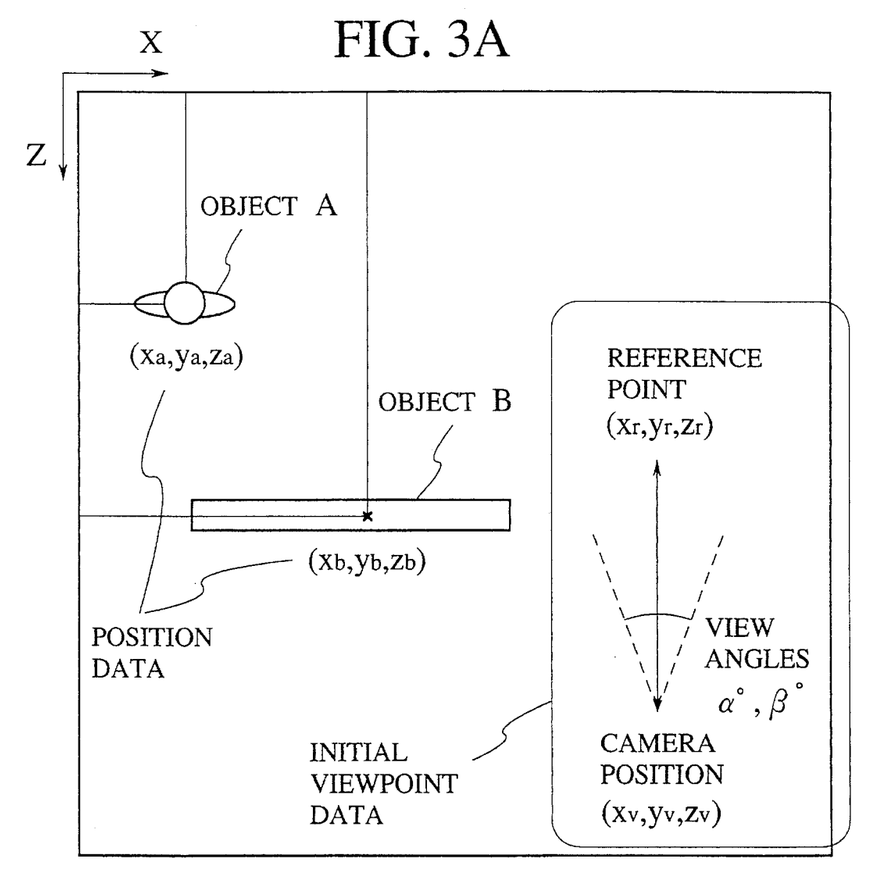
FIGS. 3A, 3B, and 3C are illustrations of exemplary object data used in the system of FIG. 1.
Figure 3B:
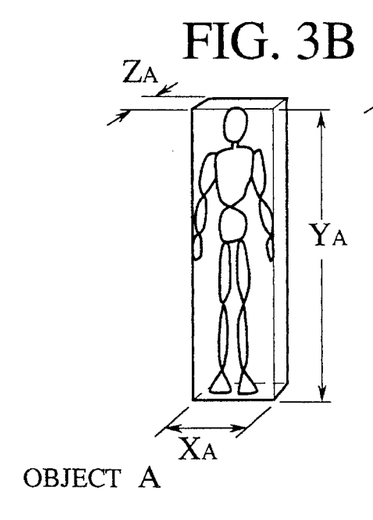
Figure 3C:
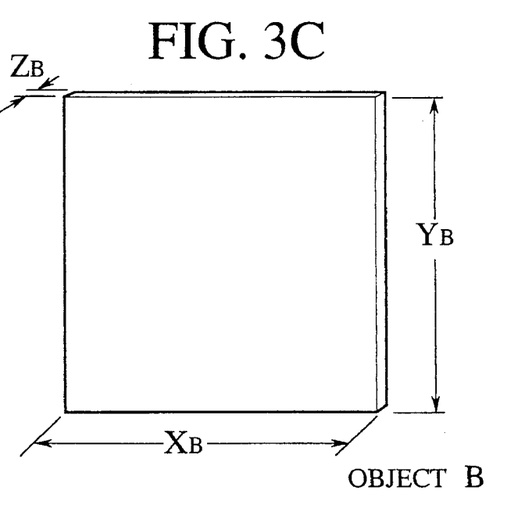
Figure 4:
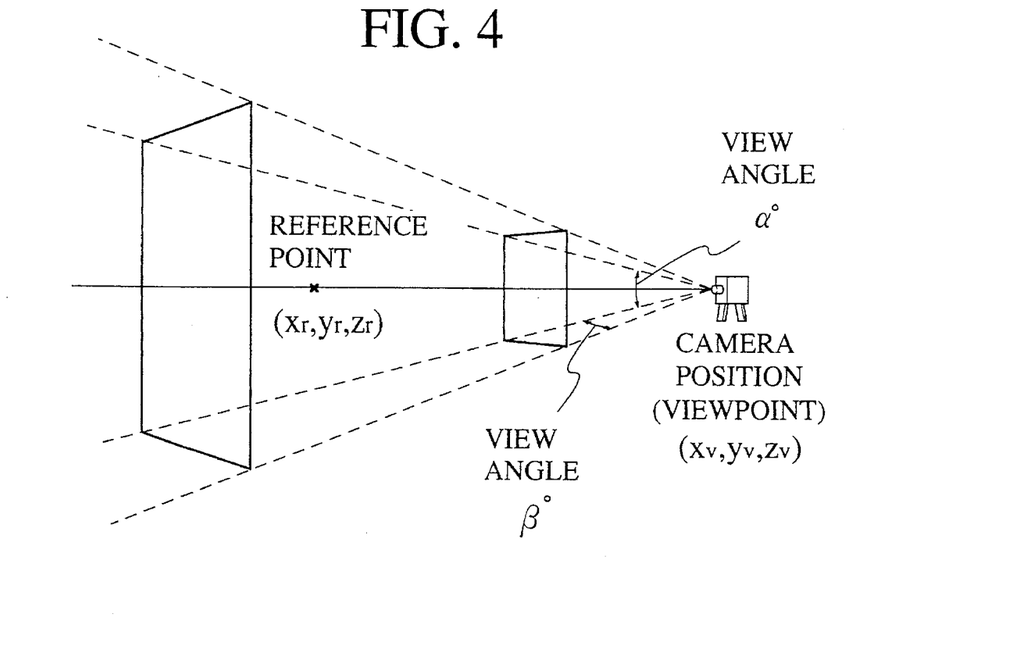
FIG. 4 is an illustration of an exemplary viewpoint data used in the system of FIG. 1.
Figure 5:
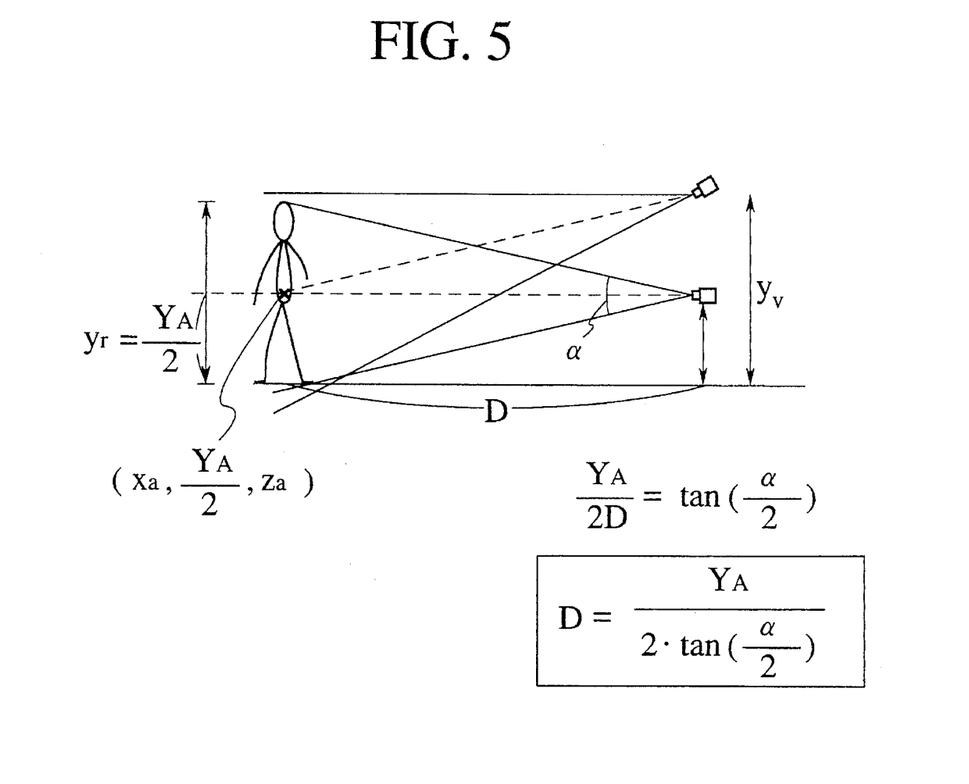
FIG. 5 is a diagram for explaining a setting of a reference point and a viewpoint in the system of FIG. 1 for one particular case.

First, the object data and the viewpoint data are entered at the object data input unit 11 and the viewpoint data input unit 12 in forms of files or commands (steps 41 and 42). Here, the object data are given in exemplary forms as shown in FIGS. 3A to 3C in which the object A in a shape of a doll shown in FIG. 3B and the object B in a form of a wall shown in FIG. 3C are arranged as indicated in a top plan view shown in FIG. 3A. On the lower right corner of this FIG. 3A, the initial viewpoint data are also indicated. Here, the viewpoint data are given in an exemplary form shown in FIG. 4 in which the camera position (viewpoint), the reference point, and view angles in vertical and horizontal directions are specified.

Next, the user specifies the imaging target (step 43) by using the interface such as a bird's eye view on which the imaging target can be specified by the mouse. Here, it is assumed that the object A is specified as the imaging target.

Then, in order to produce the dynamic image, the position and the movement of the object are generated (step 44). In a case of changing the position or the orientation alone, the stored object data can be sequentially updated by entering the name or the number assigned to the object to be moved and the moved position or orientation in a form of a file. In a case of providing the movement such as that of walking or running, the position and the angle of each portion of the object such as a hand, a leg, a torso, etc., are changed according to the motion of each portion in the required movement and the structure of the object body. Here, at a time of changing the positions and angles, the interpolation is carried out to make the movement smooth.

Next, in order to make it easier to observe the imaging target, the reference point is determined by the reference point determination unit 14 (step 45). In a case where the imaging target is the doll of FIG. 3B, the reference point can be determined such that the doll is positioned at a center of a picture frame, for example. When the y-coordinate at the doll's foot is set to 0 for convenience, the x- and z-coordinates of the reference point are going to be the same as the x- and z-coordinates of the position of the doll, while the y-coordinate of the reference point is going to be a half of the height YA of the doll, so that the reference point is at a position (xa, YA/2, za).

Figure 6A:
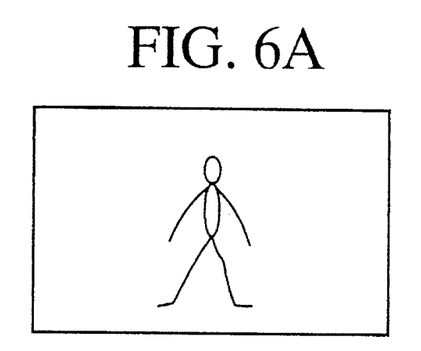
FIGS. 6A, 6B, and 6C are illustrations of exemplary appearances of an imaging target object for three different cases.

Here, in a case where the video camera is distanced from the imaging target by a certain limit distance D or more, the full length of the doll can be contained within the view angles, so that the doll appears at a center of the picture frame as indicated in FIG. 6A. When the view angle in y-direction is $\alpha$, this limit distance D can be given by the following equation (1).

$$D = YA/(2 \cdot \tan(\alpha/2)) \qquad (1)$$

Figure 6B:
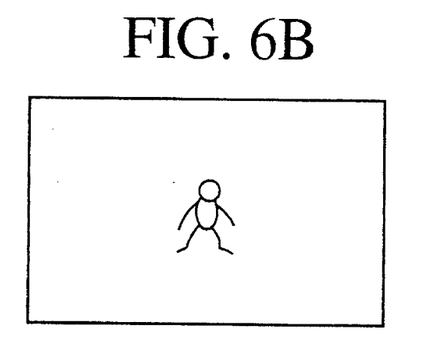

If this distance D is taken along a floor, the distance between the video camera and the reference point is equal to this distance D on the floor when the the height yv of the video camera is equal to YA/2, at which point the imaging target is captured at tile largest size. When the height of the video camera is higher or lower than this, the imaging target is going to be viewed at an angle as indicated in FIG. 6B, but in a case of a standing doll, its height is always larger than its width, so that it never stretches out of the picture frame.

For example, when the doll's height YA=170 cm, and the view angle α=60°, the limit distance D is going to be about 3 m. In other words, in this case, when the distance on the x-z plane between the reference point and the camera position is greater than 3 m, the height yr of the reference point is going to be set to a height of a center of the doll YA/2=85 cm.

Figure 6C:
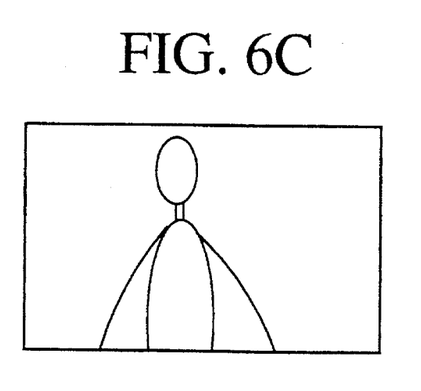
Figure 7:
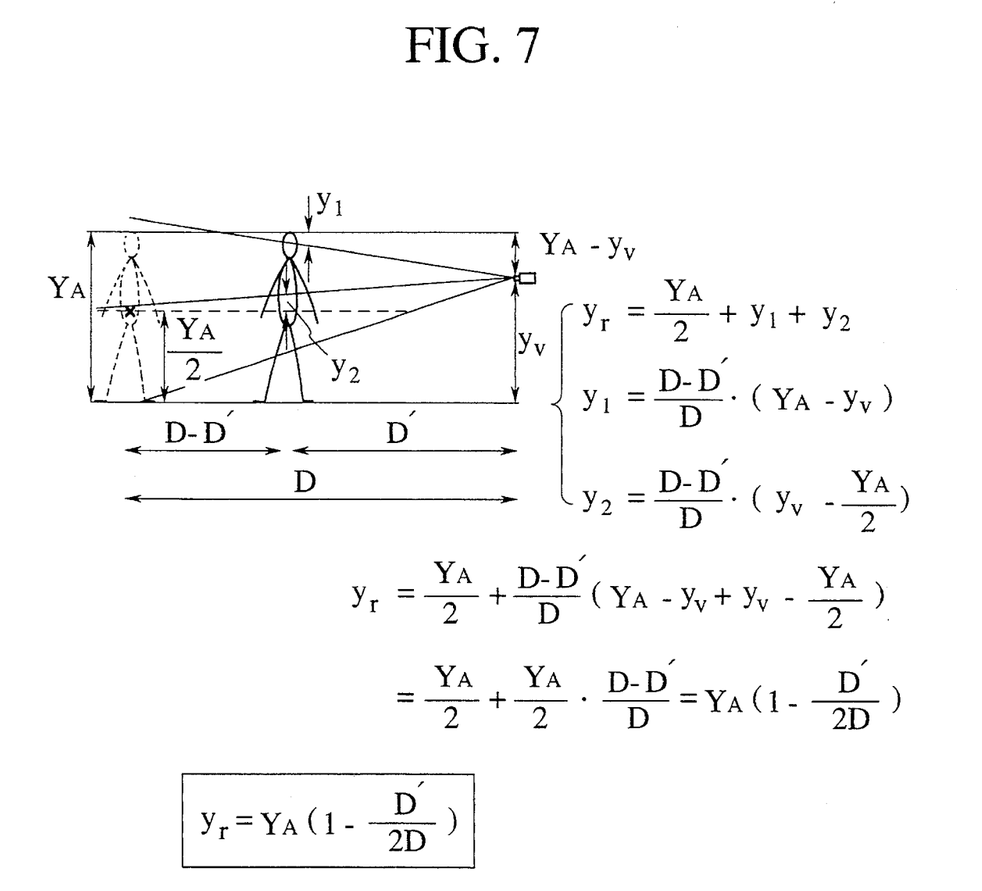
FIG. 7 is a diagram for explaining a setting of a reference point and a viewpoint in the system of FIG. 1 for another particular case.

When the reference point is set at the center in a case where the distance is less than D, there is a danger for a part of the imaging target to go out of the picture frame. For this reason, in such a case, there is a need to set up the reference point such that at least the point of attention on the imaging target does not go out of the picture frame. In a case of the doll, as indicated in FIG. 6C, it is usually preferable to keep its face within the picture frame. For instance, as shown in FIG. 7, when the camera height is yv and the distance on the floor between the video camera and the imaging target is D' less than D, it suffices to raise the height of the reference point for (y1+y2) compared with a case of the distance D, where y1=[(D−D')/D]·(YA−yv) and y2=[(D−D')/D]·(yv−YA/2). Thus, in this case, the height yr of the reference point is given by the following equation (2).

$$\begin{aligned} yr &= YA/2 + y1 + y2 \\ &= YA/2 + [(D-D')/D] \cdot (YA - yv + yv - YA/2) \\ &= YA/2 + (YA/2)*(D - D')/D \\ &= YA(1 - D'/2D) \end{aligned} \quad (2)$$

For instance, in the above example, when the distance D' is 100 cm, the height yr of the reference point is going to be yr=170·(1−100/600)≈142 cm.

Figure 8A:
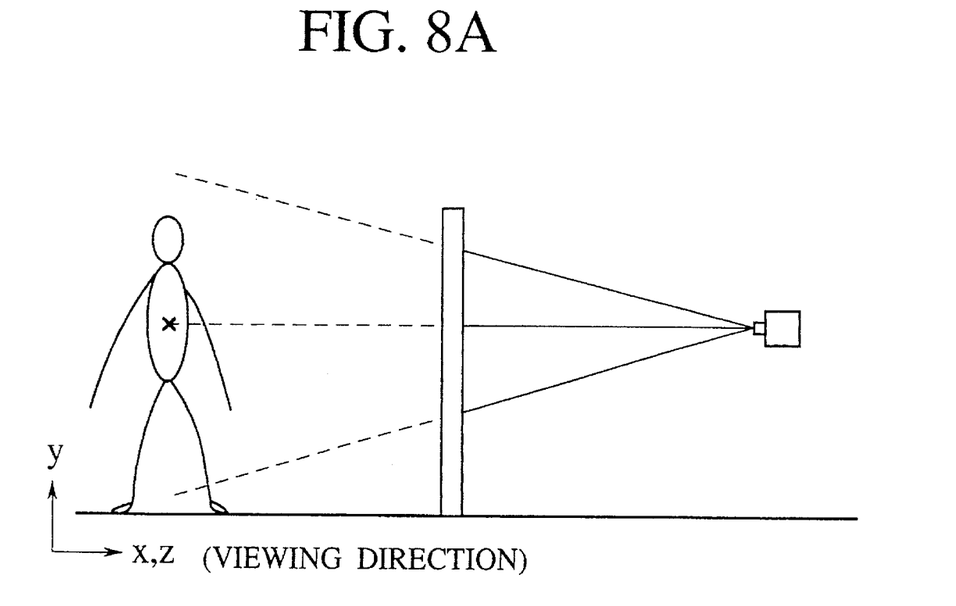
FIGS. 8A and 8B are diagrams for explaining one manner of judging a blocking of a viewing axis by another object in the system of FIG. 1.

Next, whether or not there is any blocking object between the determined reference point and the camera position is judged (step 46). Namely, as shown in FIG. 8A, whether a viewing axis defined by a line segment joining the camera position and the reference point intersects with any object or not is checked.

Figure 8B:
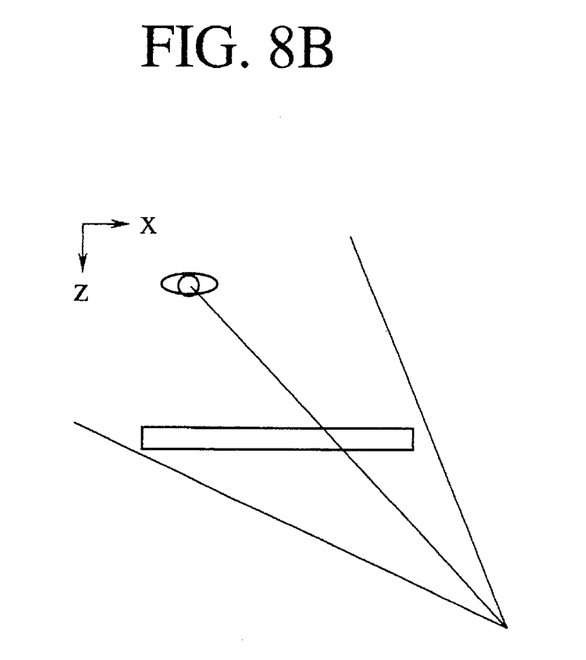

Here, for example, a rectangular region on the x-z plane for each object can be obtained from the size and the position of each object, and an existence of the intersection of this rectangular region and the viewing axis on the x-z plane is checked as indicated in FIG. 8B first. Then, only for the object for which the intersection of the rectangular region and the viewing axis exists, a rectangular region representing this object on the plane defined by the y-axis and the viewing direction is obtained and the existence of the intersection of this rectangular region and the above noted viewing axis is checked as indicated in FIG. 8A.

Figure 9:
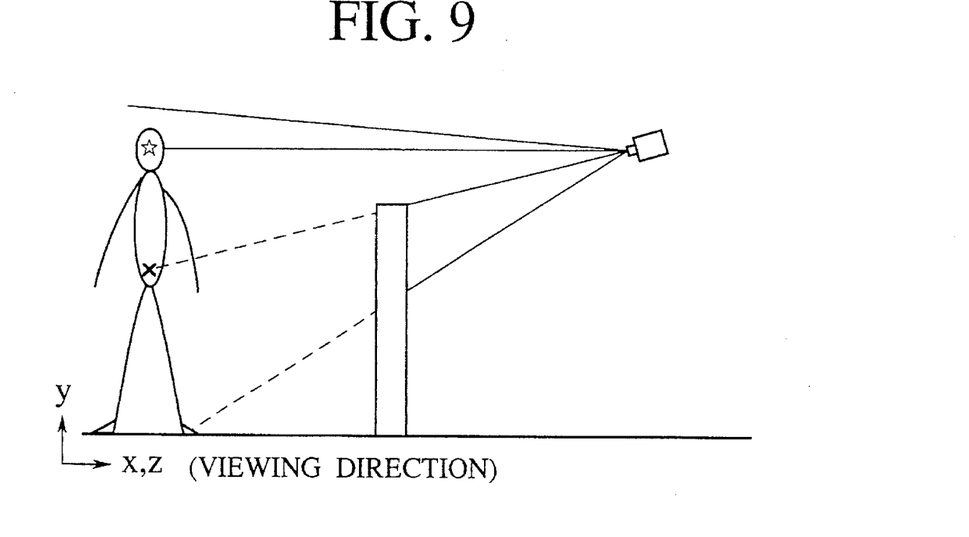
FIG. 9 is a diagram for explaining another manner of judging a blocking of a viewing axis by another object in the system of FIG. 1.

There may be cases in which it is satisfactory to have at least the main portion of the imaging target to be visible even when the above noted intersection exists, and in such cases, it is possible to check an existence of an intersection of a viewing axis joining the camera position and the main portion such as a face as indicated in FIG. 9 instead. It is also possible to define a procedure in which several main portions such as the reference point, the face, and the foot are specified and an existence of an intersection of a viewing axis joining the camera position and each one of the specified main portions is checked, and it is judged as satisfactory when the number of existing intersections is less than a prescribed number.

When it is judged that there is no blocking object at the step 46, the drawing of the image taken by the video camera is carried out straightforwardly (step 48) and the operation returns to the step 43 for the next imaging target. On the other hand, when it is judged that there is a blocking object at the step 46, the viewpoint data is changed next (step 47) and the operation returns to the step 45 for determining a new reference point according to the changed viewpoint data.

Here, a number of different manners for changing the viewpoint data are available for different situations, including a case of avoiding the blocking object, a case of approaching toward the imaging target (zooming), and a case of changing the camera height.

Figure 10:
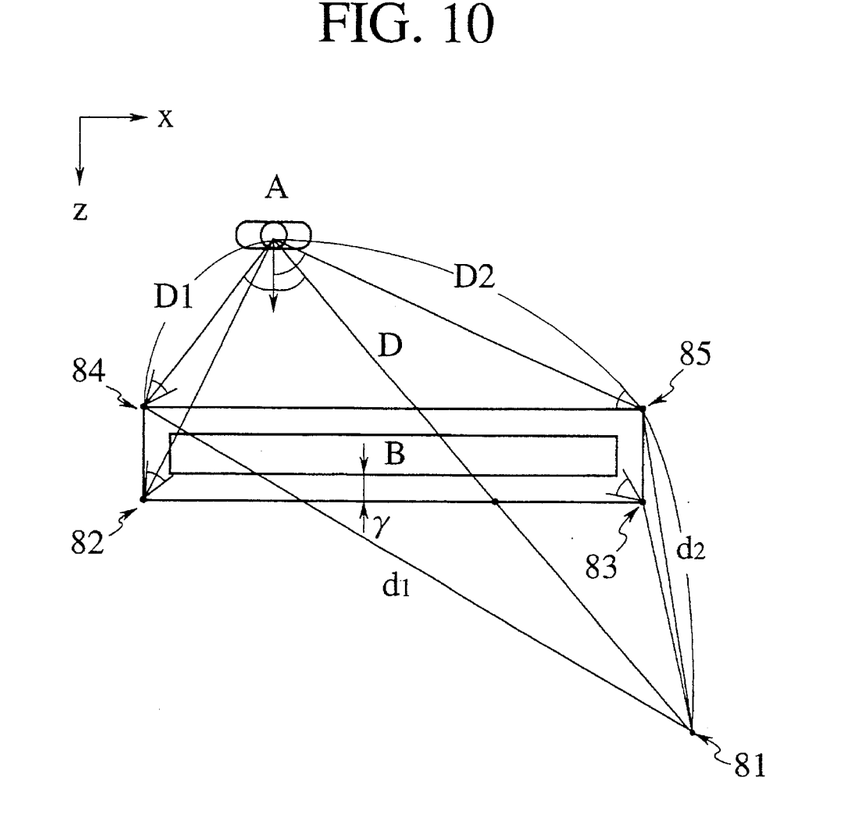
FIG. 10 is a diagram for explaining one manner of changing viewpoint data in the system of FIG. 1.

A case of avoiding the blocking object is achieved as shown in FIG. 10 which shows an exemplary case in which the imaging target object A is viewed from the initial camera position located at a point 81 and the object B is blocking the view. In this case, the coordinates of four corner points 82, 83, 84, and 85 around the object B with some margin γ are obtained as candidate new camera positions. Then, for each candidate new camera position, the reference point with respect to the imaging target object A is determined and whether the viewing axis is blocked by any object or not is judged.

When there is more than one candidate new camera position for which the viewing axis is not blocked, the comparison among these candidate new camera positions is made as follows. For example, the distances D1 and D2 from the points 84 and 85 to the reference point are compared, and one for which the difference with respect to the distance D is smaller may be selected. It is also possible to compare the distances d1 and d2 from the initial camera position 81 to the points 84 and 85 and select one which is closer to the initial camera position 81. It is also possible to obtain angles of the viewing axes from the candidate new camera positions with respect to a front side of the imaging target object A, and select one for which the difference with respect to the viewing angle from the initial camera position is smaller. In this manner, the point 85 can be selected as the new camera position in this case, for example.

Figure 11:
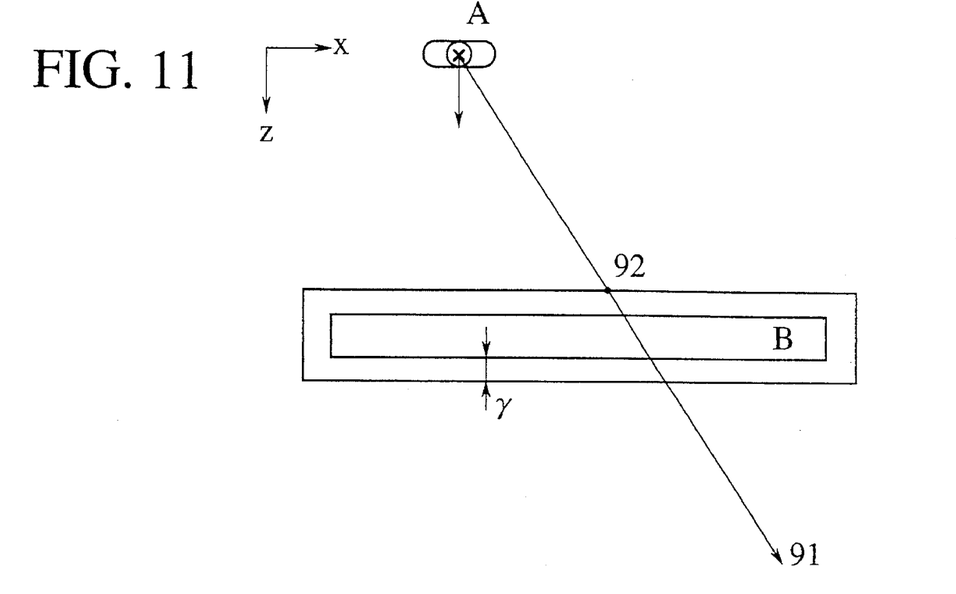
FIG. 11 is a diagram for explaining another manner of changing viewpoint data in the system of FIG. 1.
Figure 12:
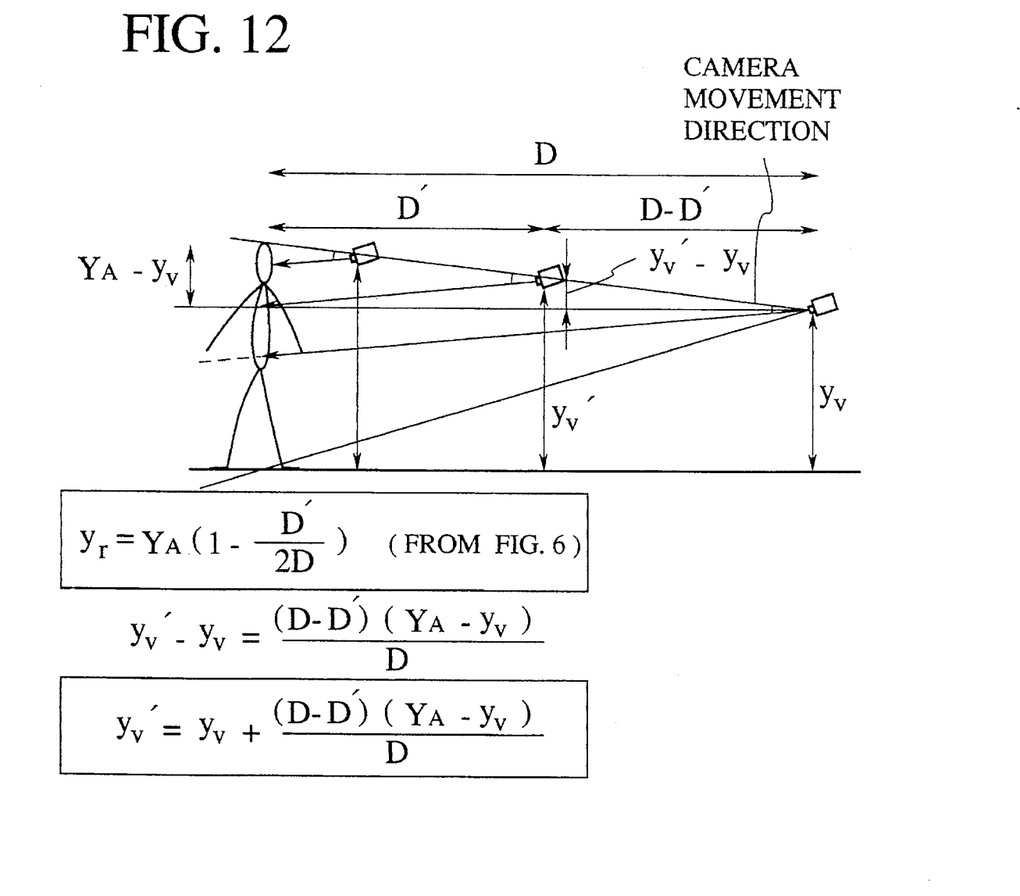
FIG. 12 is a diagram for explaining a setting of a reference point and a viewpoint in the system of FIG. 1 for a case of changing the viewpoint data as shown in FIG. 11.

A case of approaching the imaging target is achieved as shown in FIG. 11 which shows an exemplary case in which the imaging target object A is viewed from the initial camera position located at a point 91 and the object B is blocking the view. In this case, a rectangle around the object B with some margin γ is obtained, and one of the intersections of this rectangle and the viewing axis which is closer to the imaging target object A, that is a point 92 in FIG. 11, is selected as a new camera position. Here, as shown in FIG. 12, there is a need to change the camera height and the reference point so as not to change the viewing angle with respect to the imaging target. In this case, the height yr of the reference point is given by the above equation (2), while the height yv' of the camera position is given by the following equation (3) for example.

$$yv'=yv+(D-D')(YA-yv)/D \quad (3)$$

Then, whether the new viewing axis joining the newly determined camera position and reference point is not blocked by any object or not is judged.

Figure 13:
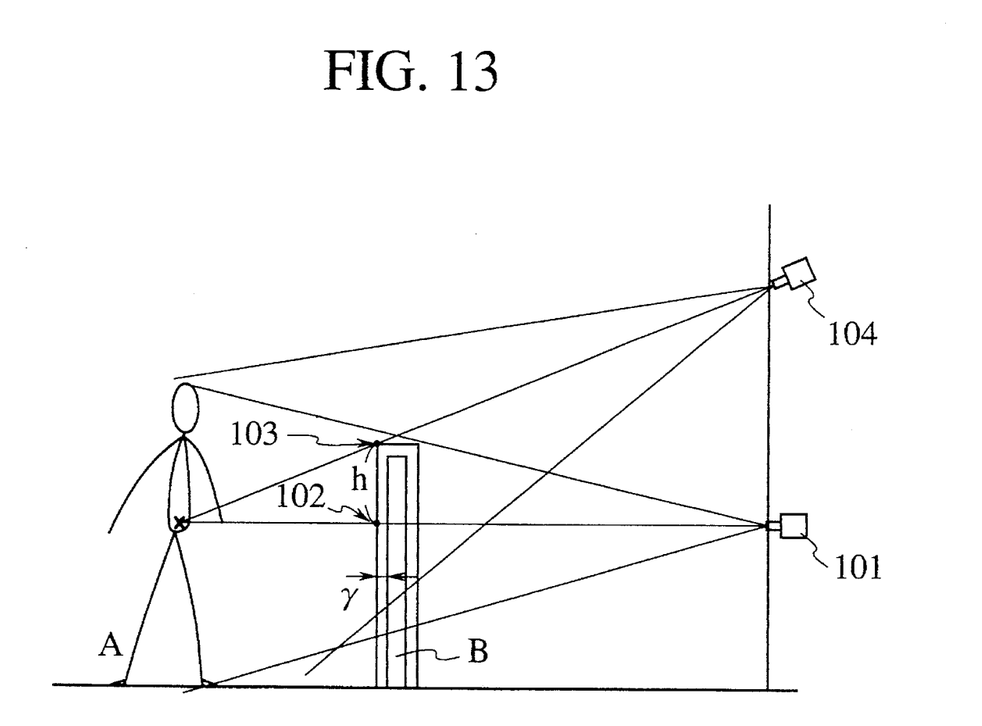
FIG. 13 is a diagram for explaining still another manner of changing viewpoint data in the system of FIG. 1.

A case of changing the camera height is achieved as shown in FIG. 18 which shows an exemplary case in which the imaging target object A is viewed from the initial camera position located at a point 101 and the object B is blocking the view. In this case, a rectangle around the object B with some margin γ is obtained, and an upper corner of this rectangle closer to the imaging target object A, that is a point 103 which is a height h above a point 102 at an intersection of the current viewing axis and this rectangle in FIG. 13, is selected, and then an intersection of an extension of a line joining this point 103 and the reference point with a vertical line at the current camera position, that is a point 104 in FIG. 14, is set as a new camera position.

It is possible to use any one of these different manners for changing the viewpoint data, or the candidates obtained by these different manners for changing the viewpoint data can be compared with each other and the best one can be selected. It is also possible to urge the user to select the desired one by displaying the image viewed from each of the candidate new camera positions. It is also possible to display a plurality of images viewed from a plurality of candidate new camera positions in a plurality of windows simultaneously. It is also possible to allow the user to specify the manner of moving the video camera in advance.

In a case where the blocking object is an object having windows and doors which is more complicated than a simple wall of the object B, the positions and sizes of the windows are entered and whether it is possible to view the imaging target object through the windows or not is judged. When it is judged that the imaging target object can be viewed through the windows, this object is not judged as the blocking object, whereas otherwise the manner of changing the viewpoint data can include the checking of the view through the windows.

It is also possible to enter a plurality of initial viewpoint data in advance, and the viewpoint data is switched among them as soon as the view of the current viewpoint data is blocked. Here, one of the remaining viewpoint data which is closest to the imaging target object may be selected as the next viewpoint data for example. It is also possible to realize the automatic camera switching function in which the current video camera is selectively switched to the optimum video camera among a plurality of video cameras automatically according to the interference check and the comparison of distances.

At a time of changing the viewpoint data, it is possible to specify whether or not to use the interpolation. In a case of not using the interpolation, the viewpoint data is replaced by the new viewpoint data obtained by the calculation, whereas in a case of using the interpolation, the linear interpolation from the current viewpoint data to the calculated new viewpoint data distanced from the current viewpoint data can be carried out to produce the effect of the continuous movement of the video camera.

In particular, in a case where the imaging target is not specified, if the leading character is predetermined in each scene, the leading character can be set as the imaging target. It is also possible to give the initial viewpoint data such that the entire scope is visible in the top scene, and then specify the imaging target and the distance to the imaging target, so as to achieve the effects such as that in which the scene is switched suddenly to that of the specified imaging target, or that in which the specified imaging target is gradually approached. Even when the imaging target moves to be hidden behind the other object, it is possible to chase the imaging target by quickly switching to the other video camera or changing or moving the video camera. It is also possible to realize the sequential switching of the imaging targets in accordance with the key operations made by the user.

With these functions, it is possible to make the zoom-in or zoom-out operation of the video camera while viewing the imaging target according to the key operations made by the user. It is also easily possible to move the video camera on a sphere surrounding the imaging target according to the position of the mouse.

Now, in chasing the imaging target object in motion, the viewpoint control parameters which can be easily comprehended and commanded by a general user includes a camera position, an imaging target object, and a relative distance, height, and angle with respect to the imaging target object. Here, the imaging target object can be chased by fixing any of these viewpoint control parameters as commanded by the user or allowing the user to control any of these viewpoint control parameters, while changing the remaining parameters automatically, and there are various characteristic patterns for the video camera operation including the following.

(a) The imaging target object is chased by fixing the camera position and changing the reference point.

(b) The imaging target object is chased by maintaining the relative distance, height, and angle with respect to the imaging target object unchanged.

(c) The imaging target object is chased by sequentially changing the relative distance, height, or angle with respect to the imaging target object according to the commands from the user.

(d) The imaging target object is chased by maintaining the changing amount of the camera position and/or the reference point to be less than a prescribed amount, by interpolating the relative distance, height, and angle with respect to the imaging target object commanded by the user.

Apart from these video camera operation patterns related to the imaging target object chasing, the video camera can also be operated in the following characteristic patterns.

(e) The video camera is set in coincidence with the view field of the imaging target object.

(f) The camera position and the reference point is fixed.

(g) The camera position and the reference point is successively controlled by the user.

Thus, by defining these characteristic video camera operation patterns of the above (a) to (g) as video camera attributes which can be specified by the user through the viewpoint data input unit 12 of FIG. 1 in addition to the viewpoint data and the imaging target object specification, it becomes possible for the user to easily select a desired one of a variety of different video camera works. Then, in response to the video camera attribute specified by the user, the viewpoint data change unit 16 can change the viewpoint data so as to realize the corresponding characteristic pattern of the video camera operation.

As described, according to this embodiment, it is possible to realize the 3D dynamic image production system capable of automatically producing the appropriate viewpoint data for observing the target object such that it becomes possible for the user without the special knowledge to see the desired video image easily.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A 3D dynamic image production system, comprising:

inputting means for inputting object data indicating objects and viewpoint data indicating a viewpoint;

specifying means for specifying an imaging target object to be imaged;

judging means for automatically judging whether a viewing axis with respect to the imaging target object is blocked by another object, the viewing axis being determined according to the viewpoint data;

changing means for automatically changing the viewpoint data when the judging means judges that the viewing axis is blocked; and producing means for automatically producing a 3D dynamic image of the imaging target object according to a new viewing axis determined from the viewpoint data changed by the changing means.

2. The system of claim 1, wherein the judging means determines the viewing axis by setting up a reference point on the imaging target object and defining the viewing axis along a line joining the reference point and the viewpoint indicated by the viewpoint data.

3. The system of claim 2, wherein the judging means sets up the reference point according to a distance between the imaging target object and the viewpoint indicated by the viewpoint data.

4. The system of claim 1, wherein the changing means changes the viewpoint data by obtaining a plurality of new viewpoint candidates, making the judging means judge whether the viewing axis for each new viewpoint candidate is blocked by any object, and selecting one of the new viewpoint candidates for which the viewing axis is judged to be not blocked by any object.

5. The system of claim 4, wherein said one of the new viewpoint candidates is selected according to a distance of each new viewpoint candidate from the imaging target object.

6. The system of claim 4, wherein said one of the new viewpoint candidates is selected according to a distance of each new viewpoint candidate from an original viewpoint.

7. The system of claim 4, wherein said one of the new viewpoint candidates is selected according to an angle of a viewing axis for each new viewpoint candidate with respect to a surface of the imaging target object.

8. The system of claim 1, wherein the changing means changes the viewpoint data to move the viewpoint closer to the imaging target object so as to avoid said another object.

9. The system of claim 8, wherein the changing means changes the viewpoint data to also change a height of the viewpoint to maintain an angle of the viewing axis with respect to a surface of the imaging target object.

10. The system of claim 1, wherein the changing means changes the viewpoint data to raise a height of the viewpoint so as to avoid said another object.

11. The system of claim 1, wherein the specifying means also specifies one of video camera attributes indicating characteristic video camera operation patterns, and the changing means changes the viewpoint data to realize a characteristic video camera operation pattern indicated by a specified one of the video camera attributes.

12. A method for producing a 3D dynamic image, comprising the steps of:

inputting object data indicating objects and viewpoint data indicating a viewpoint;

specifying an imaging target object to be imaged;

automatically judging whether a viewing axis with respect to the imaging target object is blocked by another object, the viewing axis being determined according to the viewpoint data;

automatically changing the viewpoint data when it is judged that the viewing axis is blocked at the judging step; and automatically producing a 3D dynamic image of the imaging target object according to a new viewing axis determined from the viewpoint data changed at the changing step.

13. The method of claim 12, wherein the viewing axis is determined by setting up a reference point on the imaging target object and defining the viewing axis along a line joining the reference point and the viewpoint indicated by the viewpoint data.

14. The method of claim 13, wherein the reference point is set up according to a distance between the imaging target object and the viewpoint indicated by the viewpoint data.

15. The method of claim 12, wherein at the changing step, the viewpoint data is changed by obtaining a plurality of new viewpoint candidates, judging whether the viewing axis for each new viewpoint candidate is blocked by any object, and selecting one of the new viewpoint candidates for which the viewing axis is judged to be not blocked by any object.

16. The method of claim 15, wherein said one of the new viewpoint candidates is selected according to a distance of each new viewpoint candidate from the imaging target object.

17. The method of claim 15, wherein said one of the new viewpoint candidates is selected according to a distance of each new viewpoint candidate from an original viewpoint.

18. The method of claim 15, wherein said one of the new viewpoint candidates is selected according to an angle of a viewing axis for each new viewpoint candidate with respect to a surface of the imaging target object.

19. The method of claim 12, wherein at the changing step, the viewpoint data is changed to move the viewpoint closer to the imaging target object so as to avoid said another object.

20. The method of claim 19, wherein at the changing step, the viewpoint data is changed to also change a height of the viewpoint to maintain an angle of the viewing axis with respect to a surface of the imaging target object.

21. The method of claim 12, wherein at the changing step, the viewpoint data is changed to raise a height of the viewpoint so as to avoid said another object.

22. The method of claim 12, wherein the specifying step also specifies one of video camera attributes indicating characteristic video camera operation patterns, and the changing step changes the viewpoint data to realize a characteristic video camera operation pattern indicated by a specified one of the video camera attributes.

* * * * *